United States Patent [19]

Corrigan et al.

[11] Patent Number: 4,933,056
[45] Date of Patent: Jun. 12, 1990

[54] CATIONIC ELECTRODEPOSITABLE COMPOSITIONS THROUGH THE USE OF SULFAMIC ACID AND DERIVATIVES THEREOF

[75] Inventors: Victor G. Corrigan, North Olmsted, Ohio; Steven R. Zawacky, Pittsburgh, Pa.

[73] Assignee: PPG Industries, Inc., Pittsburgh, Pa.

[21] Appl. No.: 248,680

[22] Filed: Sep. 26, 1988

[51] Int. Cl.$^5$ .................... C25D 13/06; C08L 63/00; C08L 63/02

[52] U.S. Cl. .................... 204/181.7; 523/404; 523/411; 523/414; 523/415; 524/901

[58] Field of Search .................... 204/181.7; 524/901; 523/414, 415, 404, 411

[56] References Cited

U.S. PATENT DOCUMENTS 4,419,467 12/1983 Wismer .................... 204/181.7
4,677,168 6/1987 Hoy .................... 525/441
4,724,244 2/1988 Kempter et al. .................... 523/414

FOREIGN PATENT DOCUMENTS 350376 8/1973 U.S.S.R. .

OTHER PUBLICATIONS

"Cathodic Codeposition of Metals and Polymers" by Deinega et al, Kolloidnyi Zhurnal, 37, No. 4, Jul.-Aug. 1975, pp. 691-695.

Primary Examiner—John F. Niebling
Assistant Examiner—Ben C. Hsing
Attorney, Agent, or Firm—Daniel J. Long; William J. Uhl

[57] ABSTRACT

A cationic electrodepositable composition containing a resinous phase dispersed in an aqueous medium is disclosed. The resinous phase has basic nitrogen groups which are at least partially neutralized with sulfamic acid or a derivative thereof, that is, an acid of the formula:

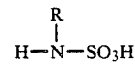

where R is H or $C_1$ to $C_4$ alkyl. The compositions are in the form of relatively small particle size aqueous dispersions, and when used in the process of cationic electrodeposition, enable the formation of thick films with high throwpower. Also, the use of sulfamic acid passivates the anode.

10 Claims, No Drawings

CATIONIC ELECTRODEPOSITABLE COMPOSITIONS THROUGH THE USE OF SULFAMIC ACID AND DERIVATIVES THEREOF

BACKGROUND OF THE INVENTION

The present invention relates to cationic electrodepositable compositions and to the use of these compositions in the method of cationic electrodeposition.

Electrodeposition as a coating application method involves deposition of a film-forming composition under the influence of an applied electrical potential. Electrodeposition has become increasingly important in the coatings industry because by comparison with nonelectrophoretic coating means, electrodeposition offers higher plant utilization, outstanding corrosion protection and low environmental contamination. Initially, electrodeposition was conducted with the workpiece being coated serving as the anode. This was familiarly referred to as anionic electrodeposition. However, in 1972, cationic electrodeposition was introduced commercially. Since that time, cationic electrodeposition has steadily gained in popularity and today is by far the most prevalent method of electrodeposition. Throughout the world, more than 80 percent of all motor vehicles produced are given a primer coating by cationic electrodeposition.

In preparing the paint composition which is used in the cationic electrodeposition process, a resinous binder which contains basic groups, such as basic nitrogen groups, is neutralized with an acid. The resultant cationic resin is dispersed in water and combined with pigment and other additives normally used in the cationic electrodeposition process to form a paint. Typically, the neutralizing acids are organic acids such as acetic acid and lactic acid because these acids provide for the most uniform and stable dispersions. Although the use of inorganic acids such as nitric, sulfuric and phosphoric acid are known as neutralizing agents in the cationic electrodeposition process, these acids do not normally provide satisfactory dispersion for the cationic electrodeposition process as practiced industrially.

In accordance with the present invention, it has been found that sulfamic acid can be used as a neutralizing agent for the cationic coating composition. The resultant dispersion has a small uniform particle size giving it enhanced stability resulting in less settling and a cleaner product. Also, cationic electrodeposition coating compositions can be made to deposit as relatively thick coatings with improved throwpower. In addition and somewhat surprisingly, the sulfamic acid passivates the anode against the corrosivity of anolytes normally associated with cationic electrodeposition compositions which are neutralized with typical organic acids such as lactic acid and acetic acid.

PRIOR ART

A Russian literature article entitled "Cathodic Co-deposition of Metals and Polymers" by Deinega et al appearing in KOLLOIDNYI ZHURNAL, 37, No. 4, July–August 1975, pages 691–695, discloses electrochemical preparation of metal-polymer coatings. The coating compositions themselves can be formulated from cationic melamine-formaldehyde, aniline-formaldehyde and urea-formaldehyde resins. It is mentioned in Table 2 on page 692 and in the description of FIG. 3 that lead sulfamate can be used along with cationic aniline-formaldehyde resins to form electrodeposition baths. However, the lead contents are exceedingly high, that is, on the order of 70,000–120,000 parts per milion (ppm) for the baths associated with Table 2, and 10,000–150,000 ppm for the baths associated with FIG. 3. Also, the pH's of such baths are very low, on the order of 1–2.

The compositions of the present invention have much lower lead contents, typically less than 2,000 ppm, and higher pH values, usually 5–8. The compositions of the present invention provide principally organic coatings which may contain small amounts of lead from pigments or other sources, whereas the compositions of the Russian reference provide organo-metallic coatings with a high percentage of lead.

U.S. Pat. No. 4,724,244 discloses cationic electrodeposition resins which contain basic nitrogen and sulfonate groups. Such resins can be prepared by reacting a resin containing primary and secondary amino groups with an amidosulfonic acid such as sulfamic acid. Reaction occurs through an aminolysis reaction that is,

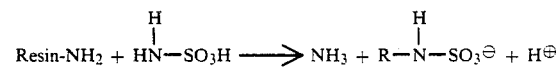

Therefore, the amidosulfonic acid is not used as a neutralizing agent as it is in the present invention. In fact, U.S. Pat. No. 4,724,244 discloses typically organic acids such as lactic acid and acetic acid as neutralizing agents.

SUMMARY OF THE INVENTION

In accordance with the present invention, a cationic electrodepositable composition containing a resinous phase dispersed in an aqueous medium is provided. The composition has a pH of at least 5, usually 5 to 8, and contains less than 2,000 parts per million (ppm) lead. The resinous phase has basic nitrogen groups which are at least partially neutralized with an acid of the formula:

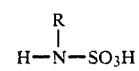

where R is H or $C_1$ to $C_4$ alkyl.

DETAILED DESCRIPTION

The acids which are used in preparing the electrocoating composition of the invention are sulfamic acid and derivatives thereof, that is, those acids of the structure:

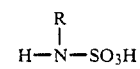

where R is H or $C_1$ to $C_4$ alkyl. Preferably, the acid is sulfamic acid itself. Hereafter, when "sulfamic acid" is used, not only sulfamic acid itself but also its derivatives as depicted by the above structure is intended.

The sulfamic acid is used to at least partially neutralize a resin containing basic groups such as basic nitrogen groups, that is,

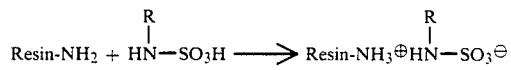

The neutralization reaction takes place under relatively mild conditions, typically, at about 20° to 100° C. The neutralization reaction can be conducted by adding the sulfamic acid with agitation to the resin and dispersing the neutralized resin in aqueous medium or the resin can be added slowly to the sulfamic acid with agitation in aqueous medium to form the dispersion. The latter method of dispersion is preferred because it results in a smaller, more uniform particle size. Hereafter, the term "neutralization" also includes "partial neutralization".

The degree of neutralization depends upon the particular resin involved. In general, the sulfamic acid is used in amounts such that the electrodepositable composition has a pH of typically from 5 to 8, preferably 6 to 7, and the resinous phase will migrate to and electrodeposit on the cathode under the voltage imposed during the electrodeposition process. Typically, the degree of neutralization is at least 30 percent of the total theoretical neutralization equivalent.

Besides sulfamic acid, mixtures of sulfamic acid with other acids such as acetic, lactic and dimethylolpropionic acid can be used. If mixtures are used, the sulfamic acid typically constitutes at least 30 percent by weight of the total neutralizing acid.

The resin which is neutralized with the sulfamic acid is the main film-forming resin of the electrodepositable composition. Examples of such film-forming resins are the reaction products of epoxide group-containing resins and primary and secondary amines such as those described in U.S. Pat. Nos. 3,663,389; 3,984,299; 3,947,338 and 3,947,339. Usually, the epoxide group-containing resin has a 1,2-epoxy equivalency greater than 1 and preferably is a polyglycidyl ether of a polyhydric phenol such as 4,4'-bis(hydroxyphenyl)propane. Other examples include polyglycidyl ethers of phenol-formaldehyde condensates of the novolak type and copolymers of glycidyl acrylate or methacrylate.

Usually these resins are used in combination with blocked polyisocyanate curing agents. The polyisocyanate can be fully blocked as described in the aforementioned U.S. Pat. No. 3,984,299, or the isocyanate can be partially blocked and reacted with the resin backbone such as described in the aforementioned U.S. Pat. No. 3,947,338. Besides blocked polyisocyanate curing agents, transesterification curing agents such as described in European Application No. 12,463 can be used. Also, cationic electrodeposition compositions prepared from Mannich bases such as described in U.S. Pat. No. 4,134,932 can be used. One-component compositions as described in U.S. Pat. No. 4,134,866 and DE-OS No. 2,707,405 can also be used as the film-forming resin. Besides the epoxy-amine reaction products, film-forming resins can be selected from amino group-containing acrylic copolymers such as those described in U.S. Pat. Nos. 3,455,806 and 3,928,157.

The preferred resins are those which contain primary and/or secondary amino groups. Such resins are described in U.S. Pat. Nos. 3,663,389; 3,947,339 and 4,116,900. In U.S. Pat. No. 3,947,339, a polyketimine derivative of a polyamine such as diethylenetriamine or triethylenetetraamine is reacted with an epoxide group-containing resin. When the reaction product is neutralized with the sulfamic acid and dispersed in water, free primary amine groups are generated. Also, equivalent products are formed when polyepoxide is reacted with excess polyamines such as diethylenetriamine and triethylenetetraamine and the excess polyamine vacuum stripped from the reaction mixture. Such products are described in U.S. Pat. Nos. 3,663,389 and 4,116,900.

The aqueous cationic compositions of the present invention are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 10 and usually less than 5 microns, preferably less than 0.5 micron. The dispersions of the present invention are of relatively small particle size compared to similar dispersions prepared with typical organic acids such as lactic and acetic acid. The smaller particle size provides better dispersion stability.

The concentration of the resinous phase in the aqueous medium is usually at least 1 and usually from about 2 to 60 percent by weight based on weight of the aqueous dispersion. When the compositions of the present invention are in the form of resin concentrates, they generally have a resin solids content of about 26 to 60 percent by weight based on weight of the aqueous dispersion. When the compositions of the present invention are in the form of electrodeposition baths, the resin solids content of the electrodeposition bath is usually within the range of about 5 to 25 percent by weight based on total weight of the aqueous dispersion.

Besides water, the aqueous medium may contain a coalescing solvent. Useful coalescing solvents include hydrocarbons, alcohols, esters, ethers and ketones. The preferred coalescing solvents include alcohols, polyols and ketones. Specific coalescing solvents include isopropanol, butanol, 2-ethylhexanol, isophorone, 4-methoxy-pentanone, ethylene and propylene glycol and the monoethyl, monobutyl and monohexyl ethers of ethylene glycol. The amount of coalescing solvent is generally between about 0.01 and 25 percent and when used, preferably from about 0.05 to about 5 percent by weight based on weight of the aqueous medium.

In some instances, a pigment composition and if desired various additives such as surfactants, wetting agents, catalysts, film build additives and additives to enhance flow and appearance of the coating such as described in U.S. Pat. No. 4,423,166 are included in the dispersion. Pigment composition may be of the conventional types comprising, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the dispersion is usually expressed as a pigment-to-resin ratio. In the practice of the present invention, the pigment-to-resin ratio is usually within the range of 0.02 to 1:1. The other additives mentioned above are usually in the dispersion in amounts of about 0.01 to 20 percent by weight based on weight of resin solids.

When the aqueous dispersions as described above are employed for use in electrodeposition, the aqueous dispersion is placed in contact with an electrically conductive anode and an electrically conductive cathode with the surface to be coated being the cathode. Following contact with the aqueous dispersion, an adherent film of the coating composition is deposited on the cathode when a sufficient voltage is impressed between the electrodes. The conditions under which electrodeposition is carried out are, in general, similar to those used in electrodeposition of other types of coatings. The applied voltage may be varied and can be, for example, as low as 1 volt or as high as several thousand volts, but typically between 50 and 500 volts. The current density is usually between 0.5 ampere and 5 amperes per square foot and tends to decrease during electrodeposition indicating the formation of an insulating film. The coating compositions of the present invention can be applied to a variety of electroconductive substrates especially metals such as steel, aluminum, copper, magnesium and conductive carbon coated materials.

After the coating has been applied by electrodeposition, it is cured usually by baking at elevated temperatures such as 90°–260° C. for about 1 to 40 minutes.

As mentioned above, the cationic electrodepositable compositions of the invention neutralized with sulfamic acid are in the form of stable aqueous dispersions and have surprisingly good throwpower compared to similar compositions neutralized with typical organic acids such as acetic acid and lactic acid. By throwpower is meant the property of the electrodeposition composition to coat out at varying distances from the counter-electrode with substantially the same density of product. Several methods have been proposed for measuring throwpower including the Ford cell test and the General Motors cell test. See, for example, Brewer et al, *JOURNAL OF PAINT TECHNOLOGY*, 41, No. 535, pages 461–471 (1969); and Gilchrist et al, American Chemical Society, Div. of Organic Coatings and Plastics Chemistry, Preprint Book 31, No. 1, pages 346–356, Los Angeles Meeting, March–April 1971.

In addition, it has been found that in the cationic electrodeposition process, the use of sulfamic acid-neutralized resins passivates the counter-electrode or the anode. Typically, anodes are made from stainless steel and it has been found during the cationic electrodeposition process using a typical organic acid such as acetic acid and lactic acid, the anode slowly dissolves over a period of time. The dissolution of the anode results in low film builds and poor appearance. Eventually, if the dispersion is great enough, the anode must be replaced resulting in a time-consuming and expensive shut down of the electrodeposition process. The use of sulfamic acid-neutralized resins passivates the anode in that the anode will not dissolve or will dissolve at a significantly slower rate in comparison to a similar system using a typical organic acid-neutralized resin.

Illustrating the invention are the following examples which, however, are not to be considered as limiting the invention to their details. All parts and percentages in the examples as well as throughout the specification are by weight unless otherwise indicated.

EXAMPLES

The following Examples show the preparation of various ingredients used in the formulation of cationic electrodeposition paints and show the formulation of the cationic electrodeposition paints themselves. Specifically, a cationic electrodeposition resin neutralized with sulfamic acid was prepared and compared with similar cationic electrodeposition resins neutralized with lactic acid and acetic acid for particle size. Also, the resultant cationic electrodeposition paints were compared with one another for throwpower. Finally, the sulfamic acid was compared to the lactic and acetic acid for passivating the anode.

EXAMPLES A–C

These Examples show the preparation of various resinous ingredients for use in the formulation of cationic electrodeposition paints.

EXAMPLE A

This Example shows preparation of a polyepoxidepolyoxyalkylenediamine adduct for subsequent addition to a cationic electrodeposition bath to provide better appearance in the cured coating. In order to prepare the adduct, an intermediate polyepoxide was prepared from the following mixture of ingredients:

| Ingredients | Parts by Weight |
| --- | --- |
| EPON 828[1] | 1000.0 |
| Bisphenol A | 308.1 |
| Ethyltriphenyl phosphonium iodide | 1.3 |
| 2-Butoxyethanol | 413.5 |

[1]Diglycidyl ether of bisphenol A having an epoxy equivalent weight of about 188, commercially available from the Shell Chemical Co.

The EPON 828 and bisphenol A were charged to a reaction vessel under a nitrogen blanket and heated to 110° C. The reaction mixture was held at 110° C. until all the bisphenol A had dissolved whereupon the ethyltriphenyl phosphonium iodide catalyst was added and the reaction mixture was heated to 160° C. to initiate reaction. The mixture was allowed to exotherm to 180° C. and then was cooled to 160° C. where it was held for an hour to complete reaction. When the hold was over, the 2-butoxyethanol was added to give a solids content of 76 percent and an epoxy equivalent of 504 (based on solids).

The adduct was then prepared from the following mixture of ingredients:

| Ingredients | Parts by Weight |
| --- | --- |
| JEFFAMINE D-2000 | 2362.2 |
| Polyepoxide intermediate prepared as described above | 1161.1 |
| 2-Butoxyethanol | 308.5 |
| Polyurethane crosslinker[1] | 3004.0 |
| Acetic acid | 63.2 |
| Surfactant[2] | 83.4 |
| Deionized water | 7478.7 |

[1]Polyurethane crosslinker was prepared from half-capping toluene diisocyanate (80/20 2,4-/2,6-isomer mixture) with 2-butoxyethanol and reacting this product with trimethylolpropane in a 3:1 molar ratio. The crosslinker is present as a 72 percent solids solution in 2-ethoxy-ethanol.
[2]Cationic surfactant prepared by blending 120 parts of alkyl imidazoline commercially available from Geigy Industrial Chemicals as GEIGY AMINE C, 120 parts by weight of an acetylenic alcohol commercially available from Air Products and Chemicals, Inc. as SURFYNOL 104, 120 parts by weight of 2-butoxyethanol and 17.9 parts by weight of glacial acetic acid.

A polyoxypropylenediamine having a molecular weight of 2000 and commercially available from Jefferson Chemical Company as JEFFAMINE D-2000 was reacted with the polyepoxide intermediate as follows: The JEFFAMINE D-2000 was charged to a reaction vessel under a nitrogen atmosphere and heated to 90° C. The polyepoxide intermediate and the 2-butoxyethanol were added over a ½ hour period. At the completion of the addition, the reaction mixture was heated to 130° C., held for 3 hours and the crosslinker added. The resin was allowed to mix for ½ hour at 110° C. and then dispersed by pouring into a mixture of the acetic acid, surfactant and deionized water. The resulting reaction product had a solids content of 38.5 percent.

EXAMPLE B

A quaternizing agent for use in preparing a pigment grinding vehicle was prepared from the following mixture of ingredients:

| Ingredients | Parts by Weight |
|---|---|
| 2-Ethylhexanol half-capped toluene diisocyanate in methyl isobutyl ketone at 95% solids | 320 |
| Dimethylethanolamine | 87.2 |
| 88% Aqueous lactic acid solution | 117.6 |
| 2-Butoxyethanol | 39.2 |

The 2-ethylhexanol half-capped toluene diisocyanate was added to the dimethylethanolamine in a suitable reaction vessel at room temperature. The mixture exothermed and was stirred for one hour at 80° C. Lactic acid was then charged followed by the addition of 2-butoxyethanol. The reaction mixture was stirred for about one hour at 65° C. to form the desired quaternizing agent.

EXAMPLE C

A pigment grinding vehicle was prepared from the following mixture of ingredients:

| Ingredients | Parts by Weight |
|---|---|
| EPON 829[1] | 710.0 |
| Bisphenol A | 289.6 |
| Half-capped isocyanate of Example B | 406.0 |
| Quaternizing agent of Example B | 496.3 |
| Deionized water | 71.2 |
| 2-Butoxyethanol | 1205.6 |

[1]Diglycidyl ether of bisphenol A having an epoxy equivalent weight of about 188, commercially available from Shell Chemical Co.

The EPON 829 and bisphenol A were charged under a nitrogen atmosphere to a suitable reaction vessel and heated to 150° to 160° C. to initiate an exotherm. The reaction mixture was allowed to exotherm and then held at 150° to 160° C. for an hour. The reaction mixture was then cooled to 120° C. and the 2-ethylhexanol half-capped toluene diisocyanate added. The temperature of the reaction mixture was held at 110° to 120° C. for one hour followed by the addition of the 2-butoxyethanol. The reaction mixture was then cooled to 85° to 90° C., homogenized and then charged with water followed by the addition of the quaternizing agent. The temperature of the reaction mixture was held at 80° to 85° C. until an acid value of about 1 was obtained.

EXAMPLES D-F

These Examples show the preparation of various catalysts and pigment pastes used in the preparation of various cationic electrodeposition paints.

EXAMPLE D

Dibutyltin oxide catalyst was dispersed in the grinding vehicle as described in Example C as follows:

| Ingredients | Parts by Weight |
|---|---|
| Pigment grinding vehicle as described in Example C | 145 |
| Deionized water | 271.3 |
| Dibutyltin oxide | 204.1 |

The ingredients were mixed together and ground in a steel ball mill to a Hegman No. 7 grind.

EXAMPLE E

Titanium dioxide, carbon black, basic lead silicate and dibutyltin oxide were dispersed in the pigment grinding vehicle of Example C as follows:

| Ingredients | Parts by Weight |
|---|---|
| Pigment grinding vehicle as described in Example C | 226.36 |
| Deionized water | 388.90 |
| Titanium dioxide | 564.31 |
| Carbon black | 16.54 |
| Lead silicate | 33.08 |
| Catalyst paste of Example D | 87.38 |

The above ingredients were mixed together in the order indicated and ground in a steel ball mill to a Hegman No. 7 grind.

EXAMPLE F

Aluminum silicate clay, carbon black, basic lead silicate and dibutyltin oxide were dispersed in the pigment grinding vehicle of Example C as follows:

| Ingredients | Parts by Weight |
|---|---|
| Pigment grinding vehicle as decribed in Example C | 228.89 |
| Deionized water | 373.42 |
| Aluminum silicate clay | 311.24 |
| Lead silicate | 50.18 |
| Carbon black | 39.92 |
| Catalyst paste of Example D | 103.21 |

The above ingredients were mixed together in the order indicated and ground in a steel ball mill to a Hegman No. 7 grind.

EXAMPLE G

This Example shows the preparation of an epoxide group-containing resin and a mixture of amines, one of which is a secondary amine and one of which is a secondary amine containing ketimine group. The reaction product was then neutralized and dispersed in water with lactic acid (Example G-1), acetic acid (Example G-2) and with sulfamic acid (Example G-3). The dispersions were compared for particle size. The epoxy-amine resinous reaction product was prepared from the following mixture of ingredients:

| Ingredients | Parts by Weight |
|---|---|
| EPON 828 | 2510.2 |
| Bisphenol A-ethylene oxide adduct (1/6 molar ratio) | 897.7 |
| Bisphenol A | 727.7 |
| Methyl isobutyl ketone | 217.9 |
| Benzyldimethylamine | 3.5 |
| Benzyldimethylamine | 10.8 |
| Crosslinker[1] | 3604.5 |
| Diketimine[2] | 285.2 |
| N-methylethanolamine | 241.8 |
| 1-Phenoxy-2-propanol | 355.4 |

[1]Polyurethane crosslinker was formed from half-capping toluene diisocyanate (80/20 2,4-/2,6-isomer mixture) with 2-hexoxyethanol and reacting this product with trimethylolpropane in a 3:1 molar ratio. The crosslinker is present as a 70 percent solids solution in methyl isobutyl ketone and butanol (9:1 weight ratio).
[2]Diketimine derived from diethylene triamine and methyl isobutyl ketone (73 percent solids in methyl isobutyl ketone).

The EPON 828, bisphenol A-ethylene oxide adduct, bisphenol A and methyl isobutyl ketone were charged to a reaction vessel and heated under a nitrogen atmosphere to 140° C. The first portion of the benzyldimethylamine was added and the reaction mixture allowed to exotherm to about 185° C. and refluxed to remove azeotropically any water present. The reaction mixture was cooled to 160° C., held for ½ hour, cooled further to 145° C. and the second portion of benzyldimethylamine added. The reaction was held at 145° C. until a reduced Gardner-Holdt viscosity (50 percent resin solids in 2-methoxypropanol) of R-S was obtained. At this point, the crosslinker, the diketimine and N-methylethanolamine were added in succession. The mixture was allowed to exotherm and then a temperature of 125° C. was established. After one hour at 125° C., the 1-phenoxy-2-propanol was added to the resin mixture and the mixture allowed to mix at 125° C. for 15 minutes. Three portions of resin were then dispersed as follows.

EXAMPLE G-1

The resin (2800 parts) was dispersed in aqueous medium by adding it to a mixture of 67.4 parts of 88 percent aqueous lactic acid, 35.4 parts of the cationic surfactant from Example A and 1294 parts of deionized water. The dispersion was further thinned with 2403 parts of deionized water and vacuum stripped to remove organic solvent to give a dispersion having a solids content of 35.1 percent and a particle size of 1670 Angstroms.

EXAMPLE G-2

The resin (2800 parts) was dispersed in aqueous medium by adding it to a mixture of 39.6 parts glacial acetic acid, 35.4 parts of the cationic surfactant and 1322 parts of deionized water. The dispersion was further thinned with 2403 parts of deionized water and vacuum stripped to remove organic solvent to give a dispersion having a solids content of 37.1 percent and a particle size of 1420 Angstroms.

EXAMPLE G-3

The resin (2800 parts) was dispersed in aqueous medium by adding it to a mixture of 64.0 parts sulfamic acid, 36.4 parts of the cationic surfactant and 1416 parts of deionized water. The dispersion was further thinned with 2472 parts of deionized water and vacuum stripped to remove organic solvent to give a dispersion having a solids content of 35.8 percent and a particle size of 960 Angstroms.

Examples G-1 to G-3 show the dispersed cationic resin neutralized with sulfamic acid has a considerably smaller particle size than the dispersed cationic resins neutralized with lactic and acetic acids.

EXAMPLE H

This Example shows the preparation of an amino group-containing acrylic polymer. The polymer was then neutralized and dispersed in water with lactic acid (Example H-1) and sulfamic acid (Example H-2). The dispersions were then compared for particle size. The amino group-containing acrylic polymer was prepared from the following mixture of ingredients:

| Ingredients | Parts by Weight |
| --- | --- |
| 1-Phenoxy-2-propanol | 236.2 |
| Deionized water | 18.2 |
| Ethyl acrylate | 616.0 |
| Styrene | 496.0 |
| Hydroxypropyl methacrylate | 160.0 |
| Methyl methacrylate | 56.0 |
| Glycidyl methacrylate | 272.0 |
| Tertiary dodecyl mercaptan | 52.0 |
| VAZO-67[1] | 32.0 |
| Methyl isobutyl ketone | 11.2 |
| 1-Phenoxy-2-propanol | 115.2 |
| Deionized water | 81.0 |
| ARMEEN 2C[2] | 65.9 |
| Xylene | 36.2 |
| N-methylethanolamine | 122.6 |
| Crosslinker[3] | 1086.1 |

[1] 2,2'-azobis-(2-methylbutyronitrile) available from Du Pont.
[2] Dicocoamine from Akzo Chemie America, equivalent weight = 372.
[3] Polyurethane crosslinker was formed from half-capping isophorone diisocyanate with epsilon-caprolactam and reacting this product with trimethylolpropane in a 3:1 molar ratio. The crosslinker is present as a 62 percent solids solution in methyl isobutyl ketone and 2-ethoxyethanol (1:3 weight ratio).

The first portion of 1-phenoxy-2-propanol (236.2 parts) and deionized water (18.2 parts) were charged to a reaction vessel. The ethyl acrylate, styrene, hydroxypropyl methacrylate, methyl methacrylate, glycidyl methacrylate, tertiary dodecyl mercaptan, VAZO-67, methyl isobutyl ketone and second portion of 1-phenoxy-2-propanol were charged to an erlenmeyer flask and mixed well. Ten percent of the monomer mixture was charged to the reaction vessel and the contents heated under nitrogen to reflux, about 100° C. The remaining 90 percent of the monomer mixture was added dropwise to the refluxing mixture in the reaction vessel over a 2½ hour period during which time the temperature of the refluxing reaction mixture rose to 116° C. Upon completion of the addition of the monomers, the mixture in the reaction vessel was held an additional ½ hour at 116° C. and then the second portion of water was added dropwise to the reaction mixture while distillate was collected. Once all the water had been added, the heating was continued, distillate was collected and the temperature was allowed to rise to 150° C.

The finished acrylic polymer was allowed to cool to 130° C. and the ARMEEN 2C was added as a slurry in xylene followed by the N-methylethanolamine. The reaction mixture was allowed to exotherm to 145° C. and then to cool to 125°–130° C. where it was held for 2 hours. Upon completion of the 2-hour hold, the contents of the reaction vessel water cooled to 113° C. and the crosslinker was added. The resin mixture was blended for ½ hour and cooled to 75° C. Two portions of the resin were then dispersed as follows.

EXAMPLE H-1

The resin (1500 parts) was dispersed in aqueous medium by adding it to a mixture of 38.9 parts of 88 percent aqueous lactic acid and 2891.5 parts deionized water. The dispersion was vacuum stripped to remove organic solvent to give a dispersion having a solids content of 26.2 percent and a particle size of 802 Angstroms.

EXAMPLE H-2

The resin (1500 parts) was dispersed in aqueous medium by adding it to a mixture of 36.9 parts of sulfamic acid and 2903.5 parts deionized water. The dispersion was vacuum stripped to remove organic solvent to give a dispersion having a solids content of 27.1 percent and a particle size of 685 Angstroms.

Examples H-1 and H-2 show the dispersed cationic resin neutralized with sulfamic acid has a considerably smaller particle size than the dispersed cationic resin neutralized with lactic acid.

EXAMPLES I-V

These Examples show the preparation of cationic electrodeposition paints using the cationic resin of Examples G-1, 2, 3 and H-1, 2, as well as certain additives and pastes described in the preceding examples.

EXAMPLE I

A control cationic electrodeposition bath was formulated with the lactic acid-neutralized reaction product of Example G-1 as follows:

| Ingredients | Parts by Weight |
| --- | --- |
| Cationic resin of Example G-1 | 1408.7 |
| Additive of Example A | 185.6 |
| PARAPLEX WP-1[1] | 36.3 |
| Deionized water | 1977.9 |
| Pigment paste of Example E | 391.5 |

[1]The PARAPLEX WP-1 is a propoxylated cresol commercially available from Rohm and Haas.

The additive, PARAPLEX WP-1 and a small amount of the deionized water (100 parts) were first mixed together and the mixture further mixed with the cationic resin. The resulting mixture was then thinned with the remaining deionized water under agitation and the pigment paste then blended in under agitation. The resulting cationic electrodeposition paint had a solids content of about 21 percent and a pigment to binder ratio of 0.3/1.0.

The resulting bath was evaluated as follows. Phosphated (BONDERITE 40) steel panels were electrodeposited in the bath at a voltage of 275 volts for 2 minutes at a bath temperature of 83° F. (28° C.). The coating was then cured at 340° F. (171° C.) for 30 minutes and the smoothness and thickness of the coating determined. Using a GM throwpower cell, under the coating and cure conditions noted above, the GM throwpower was determined. The results are reported in Table I below.

EXAMPLE II

A cationic electrodeposition bath for use as a second control similar to that of Example 1 was prepared with the exception that the acetic acid-neutralized reaction product of Example G-2 was used. The bath was evaluated as in Example 1 with the results reported in Table I below.

EXAMPLE III

A cationic electrodeposition bath similar to that of Examples I and II was prepared with the exception that the sulfamic acid-neutralized reaction product of Example G-3 was used. The bath was evaluated as in Example 1 with the results reported in Table I below.

EXAMPLE IV

A control cationic electrodeposition bath was formulated with the lactic acid-neutralized amino group-containing acrylic polymer of Example H-1 as follows:

| Ingredients | Parts by Weight |
| --- | --- |
| Cationic resin of Example H-1 | 2135.1 |
| Deionized water | 1663.9 |
| Pigment paste of Example F | 201.0 |

The cationic resin was thinned with the deionized water under agitation and the pigment paste then blended in under agitation. The resulting cationic electrodeposition bath had a solids content of about 17 percent and a pigment to binder ratio of 0.13/1.0.

The resulting bath was evaluated as follows: Phosphated (BONDERITE 40) steel panels were electrodeposited in the bath at a voltage of 275 volts for 2 minutes at a bath temperature of 83° F. (28° C.). The coating was then cured at 350° F. (177° C.) for 20 minutes and the smoothness and thickness of the coating determined. Using a GM throwpower cell, under the coating and cure conditions noted above, the GM throwpower was determined. The results are reported in Table I below.

EXAMPLE V

A cationic electrodeposition bath similar to that of Example 4 was prepared with the exception that the sulfamic acid-neutralized amino group-containing acrylic polymer of Example H-2 was used. The bath was evaluated as in Example 4 with the results reported in Table I below.

TABLE I
Film Thickness, Smoothness and GM Throwpower of Examples I to V

| Example No. | Dispersing Acid | Film Thickness (in mils) | Condition of Film (Smooth or Rough) | GM Throwpower (inches) |
| --- | --- | --- | --- | --- |
| I | lactic | 1.98 | smooth | 11 7/8 |
| II | acetic | 1.90 | smooth | 12 1/4 |
| III | sulfamic | 1.93 | smooth | 12 7/8 |
| IV | lactic | 0.98 | smooth | 11 1/2 |
| V | sulfamic | 0.96 | smooth | 13 1/2 |

To determine the corrosive effect of the sulfamic acid, lactic acid and acetic acid towards stainless steel anodes, synthetic anolyte solutions were prepared as described in Examples J-L below. The anodes used in the testing were 5 inch × 1 inch 316 stainless steel electrodes and were inserted between two 5 inch × 1 inch 316 stainless steel cathodes. The electrode spacing was about 2 inches, and the electrodes were immersed to a 2-inch depth in the anolyte solutions. Testing was conducted for 4 hours at about ½ amps. The temperature of the anolyte was maintained at about 180° F. (82° C.). The results of the testing are reported in Table II below.

EXAMPLE J

A synthetic anolyte solution containing 8 milliequivalents per liter of sulfamic acid and 61.7 mg. per liter of hydrogen chloride (60 ppm Cl$^-$) in deionized water was prepared from the following mixture of ingredients.

| Ingredients | Parts by Weight (in grams) |
| --- | --- |
| 0.1 N HCl | 33.8 |
| 1% solution Sulfamic acid | 155.4 |
| Deionized water to 2 liters | 1801.8 |

EXAMPLE K

A synthetic anolyte solution similar to Example J but containing 8 milliequivalents per liter of acetic acid and 61.7 mg. per liter of hydrogen chloride (60 ppm Cl$^-$) in deionized water was prepared from the following mixture of ingredients:

| Ingredients | Parts by Weight (in grams) |
| --- | --- |
| 0.1 N HCl | 33.8 |
| 1% solution Acetic acid | 96.0 |
| Deionized water to 2 liters | 1796.1 |

EXAMPLE L

A synthetic anolyte solution similar to Example J but containing 8 milliequivalents per liter of lactic acid and 61.7 mg. per liter of hydrogen chloride (60 ppm Cl$^-$) in deionized water was prepared from the following mixture of ingredients:

| Ingredients | Parts by Weight (in grams) |
| --- | --- |
| 0.1 N HCl | 33.8 |
| 1% of an 88% lactic acid solution | 163.6 |
| Deionized water to 2 liters | 1792.5 |

TABLE II

Anode Dissolution Rate in Anolyte Solution of Examples J–L

| Anolyte Solution Example | Acid | Anode Dissolution Rate (mils/year)[1] |
| --- | --- | --- |
| J | Sulfamic | 29.6 |
| K | Acetic | 5498 |
| L | Lactic | 6317 |

[1]Determined according to ASTM D-A262.

The results of the Examples immediately above show that anolytes containing acetic acid and lactic acid are very aggressive in dissolving stainless steel anodes. Sulfamic acid, on the other hand, exerts a passivating effect as evidenced by very low rate of anode dissolution.

We claim:

1. A cationic electrodepositable composition comprising a resinous phase dispersed in an aqueous medium, said composition having a pH of at least 5 and containing less than 2,000 ppm lead, said resinous phase having basic nitrogen groups which are at least partially neutralized at a temperature of from about 20° C., to about 100° C. with an acid of the formula:

$$H-N(R)-SO_3H$$

where R is H or $C_1$ to $C_4$ alkyl.

2. The cationic electrodepositable composition of claim 1 in which the dispersed resinous phase is present in amounts of 2 to 60 percent by weight based on total weight of the electrocoating composition.

3. The composition of claim 1 which contains as basic nitrogen groups primary amine groups.

4. The composition of claim 3 in which the resinous phase is the reaction product of an epoxide group-containing resin and a secondary amine which contains ketimine groups.

5. The composition of claim 1 in which said resinous phase is the reaction product of an epoxide group-containing resin and a primary or secondary amine.

6. The composition of claim 1 in which the resinous phase is an amino group-containing acrylic polymer.

7. The composition of claim 1 which further contains a blocked polyisocyanate curing agent.

8. A method for coating a conductive substrate serving as a cathode in an electrical circuit comprising said cathode and an anode immersed in an aqueous cationic electrocoating composition comprising passing electric current between said anode and said cathode so as to cause the electrocoating composition to deposit as a coating on the cathode, characterized in that the electrocoating composition comprises a resinous phase dispersed in an aqueous medium, said composition having a pH of at least 5 and containing less than 2,000 ppm lead, said resinous phase having basic nitrogen groups which are at least partially neutralized at a temperature of from about 20° C. to about 100° C. with an acid of the formula:

$$H-N(R)-SO_3H$$

where R is H or $C_1$ to $C_4$ alkyl.

9. The method of claim 8 in which the resinous phase of the cationic electrocoating composition is the reaction product of an epoxide group-containing resin and a primary or secondary amine.

10. The method of claim 8 in which the cationic electrocoating composition further contains a blocked isocyanate curing agent.

* * * * *